Patented Nov. 16, 1937

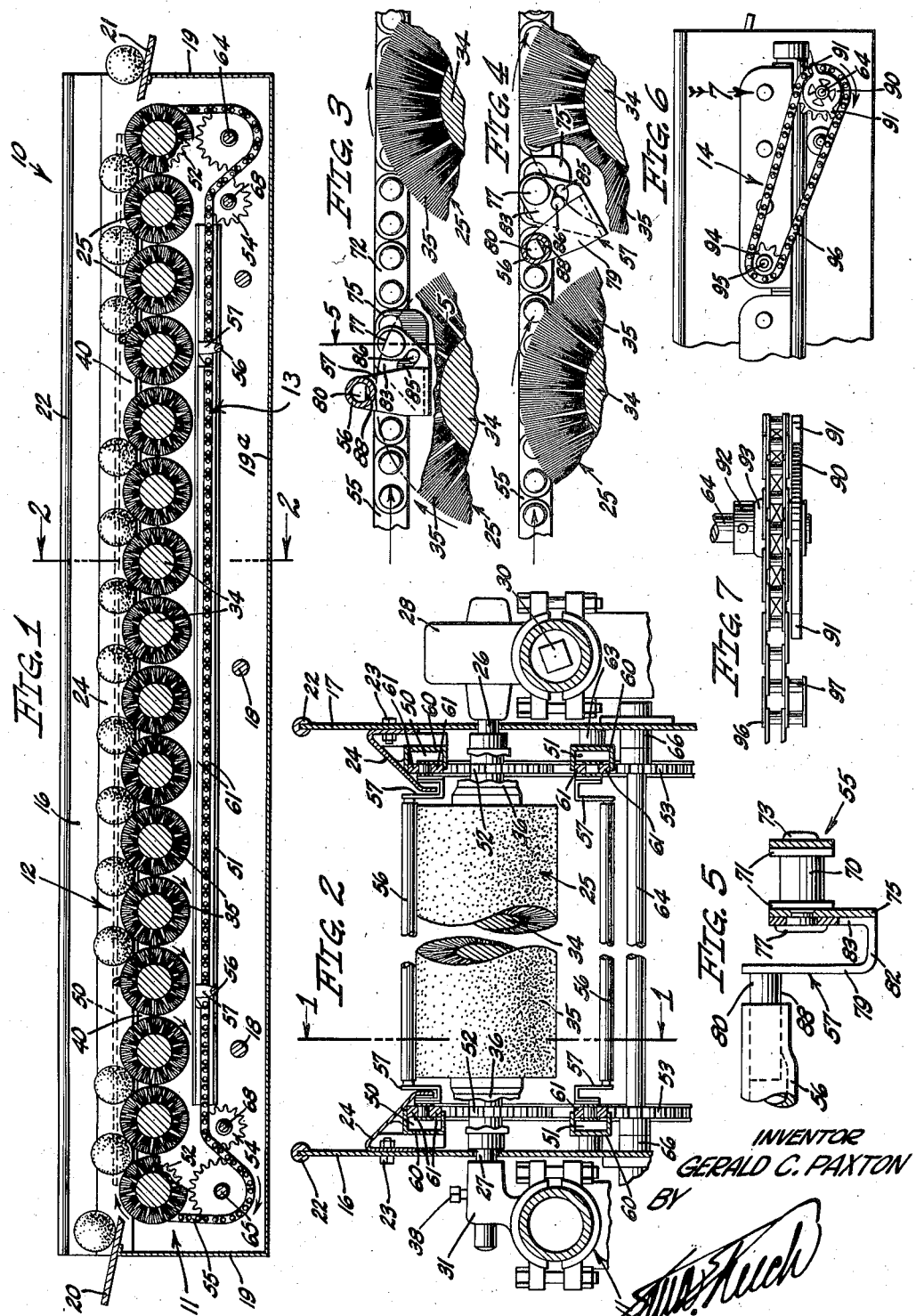

2,099,221

UNITED STATES PATENT OFFICE 2,099,221

DROP BAR CLEAN-OUT

Gerald C. Paxton, Santa Ana, Calif., assignor, by mesne assignments, to Food Machinery Corporation, a corporation of Delaware Application March 23, 1936, Serial No. 70,493

14 Claims. (Cl. 146—202)

My invention relates to devices for conveying rollable articles and has particularly, utility in devices of this nature in which such articles receive a treatment through contact of the articles with the conveying surfaces of such devices.

During the past decade, transverse roller conveyors have come into wide use in handling citrus fruits, and particularly oranges, incidental to accomplishing a treatment on the fruit such as washing, drying, or polishing the fruit. In most of these conveyors the rollers constitute cylindrical brushes and the various treatments are effected in part at least by the brushing action of these brushes upon the fruit.

My invention has to do with such conveyors and, being particularly useful in a transverse fruit brusher, will be described herein as embodied in such a device.

The transverse rollers of a transverse fruit brusher form a series of valleys, one between each adjacent pair of rollers. Treatment of the fruit results from rotating the brush rollers all in the same direction while the fruit rests on the rollers in the valleys therebetween. The fruit remains in each of these valleys until impelled therefrom into the next valley in advance thereof, by incoming fruit or until thus impelled by a mechanical device known generally as a cleanout.

In order to insure that all pieces of fruit receive a uniform degree of treatment in a transverse brush and in order to determine what that degree shall be, cleanouts have proved to be indispensable in most cases.

Most of the cleanouts heretofore devised have left something to be desired either in their construction or in the results of their operation. The present invention constitutes an improvement in the type of cleanout disclosed in the application of Hale Paxton Ser. No. 24,187, filed May 31, 1935.

It is an object of my invention to provide a cleanout having an improved means for causing the cleanout member to follow the contour of upper portions of the transverse rollers of a transverse roller conveyor.

Another object is to provide a cleanout in which the cleanout member will follow such contour more closely than previously possible.

Yet another object is to provide a more simple and inexpensive mechanism for causing the cleanout member to follow such contour.

The manner of accomplishing the foregoing objects, as well as further objects and advantages, will be made manifest in the following description taken in connection with the accompanying drawing, in which:

Fig. 1 is a longitudinal sectional view of a preferred embodiment of my invention taken on line 1—1 of Fig. 2.

Fig. 2 is an enlarged fragmentary cross-sectional view taken on line 2—2 of Fig. 1.

Fig. 3 is a still further enlarged fragmentary view illustrating a fragment of Fig. 1 and partially broken away to disclose the structure of the cleanout bar supporting arms and endless chains of my invention with the cleanout bar disposed vertically above the axes of one of the brush rollers.

Fig. 4 is a view similar to Fig. 3 illustrating the cleanout bar in its lowermost position while disposed over and traveling from left to right through one of the fruit treating valleys of the machine.

Fig. 5 is a still further enlarged fragmentary view taken on the line 5—5 of Fig. 3 and illustrating the pivotal connection of a cleanout bar supporting arm to a pivot member provided on one of the endless chains of my invention.

Fig. 6 is a fragmentary exterior side elevational view taken in the same direction as Fig. 1 and illustrating the intermittent cleanout drive mechanism of my invention.

Fig. 7 is a fragmentary enlarged plan view taken in the direction of the arrow 7 in Fig. 6.

I will now refer specifically to the drawing which shows a preferred embodiment of my invention comprising a fruit brusher 10 having a frame 11, a brush roller unit 12, a cleanout mechanism 13, and a cleanout drive unit 14.

The frame 11 includes side plates 16 and 17 secured in spaced relation by suitable tie rods 18, having end walls 19, and a floor plate 19a. Mounted at opposite ends of the frame 11 are inlet and outlet drop boards 20 and 21 respectively, as shown in Fig. 1. Provided upon upper edges of the side walls 16 and 17 are cylindrical beads 22. Secured as by bolts 23 to the side walls 16 and 17 are metal aprons 24.

The brushing unit 12 includes a series of brush rollers 25 which are rotatably mounted on drive shafts 26 and idle shafts 27, as shown in Fig. 2. The shafts 26 are mounted in gear housings 28 containing suitable gear transmission mechanism (not shown) through which all of the shafts 26 are rotated in the same direction at the same rate by a longitudinal main drive shaft 30 extending through the housing 28. The idle shafts 27 are each supported in one of a series of brackets 31 provided on the frame 11. The brush rollers 25 preferably include wooden cores 34 having heavy bristles 35 extending therefrom and trimmed to cylindrical form, each core 34 having metal ferrules 36 at its opposite ends which connect with the shafts 26 and pivotally receive the shafts 27 in the well known manner. Each of the shafts 27 is held in its respective bracket 31 by a set screw 38. The upwardly disposed surfaces of the brush rollers 25 operate to form treating surfaces for rollable objects, and particularly citrus fruits, this surface comprising a series of valleys 40 lying between adjacent brushes.

The cleanout mechanism 13 includes upper tracks 50, lower tracks 51, upper end sprockets 52, lower end sprockets 53, idler sprockets 54, endless chains 55, cleanout bars 56 and supporting arms 57.

The upper and lower tracks 50 and 51 comprise channel irons 60 having rails 61 welded in the mouth thereof and in opposed relation. The upper tracks 50 are welded to the inner surfaces of the aprons 24 so that the lower edges of these aprons extend downwardly over the space between the rails 61 just opposite the ends of the valleys 40 so as to form end walls therefor. The lower tracks 51 are mounted on spacers 63 which are secured to the frame walls 16 and 17. The sprockets 52 are mounted on the ferrules 36 of the endmost brush rollers 25 so as to be freely rotatable thereon. The sprockets 53 are fixed upon shafts 64 and 65 which are journaled in suitable bearings 66 mounted on the side walls 16 and 17. The idle sprockets 54 are pivotally mounted on suitable stub shafts 68 provided on the side walls 16 and 17. The tracks 50 and 51 and the sprockets 52, 53 and 54 are all in vertical alignment with each other and the endless chains 55 extend around these sprockets and through these tracks as clearly shown in Fig. 1.

The chains 55 are of the roller chain type having rollers 70 and inside link plates 71 and outside link plates 72, the rollers being mounted upon pins 73. In passing through the tracks 50 and 51 and rollers 70 lie in the space between the opposed rails 61 and the link plates 71 extend upwardly and downwardly opposite the upper and lower rails 61 so as to render it impossible for the chain to be dislodged from these tracks.

For each of the cleanout members 56 the chains 55 have, at points exactly opposite each other, a pair of the outer plates 72 of these chains replaced by pivot members 75 which, when disposed in the upper flights of the chains, extend downwardly below the level of the chains as shown in Fig. 3. Each of these pivot members 75 has one of the cleanout bar arms 57 pivotally connected thereto by a rivet 77 (see Fig. 3). Each of the cleanout bar arms 57 includes an upright inner portion 79 having a pin 80 extending inwardly therefrom, a lower cross portion 82 and an outer upright portion 83, the latter being suitably apertured to receive the rivet 77 (see Fig. 5). The portion 83 of each arm 57 has an arcuate slot 85 which receives a pin 86 provided in the pivot member 75 on which this arm 57 is mounted. As will be seen by a comparison of Figs. 3 and 4, the pin 86 and slot 85 permit a limited swinging movement of the arms 57 about the pivot rivets 77. The cleanout bars 56 are preferably of a light construction, as of steel tubing, the ends of this preferably being flattened as shown in Fig. 5 and fitted over pins 80 which also have flattened faces 88 to prevent the rotation of the cleanout bars 56 by the frictional contact thereof with the rollers 25.

The cleanout drive mechanism 14 includes a wheel 90 which is keyed on to the shaft 64 this wheel having a pair of diametrically opposed teeth 91 shown in Fig. 6. Also mounted on the shaft 64 is a collar 92. Between the collar 92 and the wheel 90 is an idle sprocket 93, the latter being in radial alignment with a sprocket 94 which is keyed on an outwardly extending end 95 of one of the brush roller drive shafts 26. Encircling the sprockets 93 and 94 is an endless roller chain 96 having one or more double links 97 provided thereon extending outwardly therefrom as shown in Fig. 7.

Operation

The operation of the fruit treating machine 10 when used for brushing oranges is as follows:

Power is applied to the shaft 30 causing the rotation in the direction of the arrows shown in Fig. 1 of all the brush rollers 25. This rotation is preferably between 75 R. P. M. and 250 R. P. M. Rotation of the brush roller drive shafts 26 also causes rotation of sprockets 94 and 93. Fruit, such as for instance oranges, is now fed over the dropboard 20 into the first valley 40 of the machine and after this valley has been filled the feeding of additional fruit causes fruit to overflow into the next valley and so on until all the valleys in the machine are filled with fruit. In case there should be none of the double links 97 on the cleanout actuating mechanism 14 the cleanouts 56 would not move from their regular positions, in which they are located directly above one or the other of the brush rollers 25. In such a case, the regular feeding of the fruit will cause this to pass from the valley just to the rear of each cleanout bar 56 directly over this into the valley next in advance thereof.

It is generally desirable, however, to regulate the flow of fruit through the machine as when dependence is placed upon the feeding of fruit to regulate the travel through the machine certain pieces of fruit, at the sides of the machine, tend to move much slower than those in the middle thereby causing a lack of uniformity in the treatment given the fruit in the fruit brusher 10. It is to effect this control that the cleanout mechanism 13 and its operating mechanism 14 are provided. One or more of the double links 97 are provided on the chain 96 so that as this chain travels about the sprockets 93 and 94 each of the links 97 periodically comes into contact with that one of the teeth 91 disposed in the path of this link 97. When this occurs the wheel 90 and shaft 64 are given a half revolution. As the sprockets 53, mounted on shaft 64 are keyed thereto, these sprockets rotate with shaft 64 and cause a movement of the chains 55 for a distance equal to one-half the pitch circumference of the sprockets 53 mounted on the shaft 64.

The machine 10 is preferably so designed that each of these movements begins and ends with each cleanout bar 56 which is disposed above the brush rollers 25, located directly over one of these rollers. In practice it has been found preferable to move the cleanout bars 56 during each of these movements only for a distance equal to the spacing of adjacent rollers.

As no means is provided in my invention for supporting the cleanout bars 56, these bars when over the uppermost portions of each of the brush rollers 25 rest directly upon these rollers, as indicated diagrammatically in Fig. 3 in which a cleanout bar 56 is there shown in its extremely elevated position and the upper surface of the brush roller therebeneath is indicated in a broken line.

While moving up onto each of the brush rollers 25 a cleanout bar 56 is lifted by engagement of the bar with the surface of that roller travelling in an upward direction. This friction, of course, easily lifts the light cleanout tube 56 and supports this when the cleanout mechanism pauses with this cleanout member directly above the axis of a brush roller 25, as shown in Fig. 3. The forces exerted on the cleanout bar travel along the plane which passes through the pivotal axis of the arms 57 and the line of contact between the cleanout bar and the roller 25 on which it is resting. This plane, of course, intersects with the plane in which the frictional forces between the roller and the cleanout bar are exerted against the bar. The latter plane, of course, is always tangent to the brush roller 25 at the line where this is touched by the bar. Where the angle between these two planes which faces the brush is less than 180°, the combined effect of the frictional forces exerted against the bar by the roller and the forces exerted against the bar by the arms 57, is to create a resultant force tending to maintain the cleanout bar riding freely on the surface of the roller. This condition exists when the cleanout bar is riding up on the rising side of a roller and also when the cleanout bar is pausing directly over the crest of the roller. It also continues to exist for a substantial portion of the travel of the cleanout bar across the downward moving portion of the roll on which it rests during the latter half of its travel over a roll.

As one of the links 97 of the actuating mechanism 14 engages a tooth 91 and thus abruptly starts one of the intermittent movements of the chains 55 each of the cleanout bars 56, disposed over the brushes 25, is drawn with equal suddenness to the right from the position in which one of these is shown in Fig. 3 until it is again located directly over the next adjacent brush roller 25. Just before this cleanout member passes out of contact with the roller over which it had just previously been superimposed the line of tangency between it and that roller swings downwardly theoretically giving the cleanout member a tendency to bite into the surface of the roller. This tendency has very slight effect, however, owing to the rapidity of the intermittent movement of the cleanout member and the limitation of the downward movement which it is possible for the cleanout member 56 to have owing to the engagement of the pin 86 with the upper end of the slot 85 as shown in Fig. 4.

During each advance thus made by the cleanout bars 56, the fruit in the valleys across which these bars travel is scooped out of these valleys and over into the valleys next beyond these, respectively. This intermittent but progressive and positive movement of the fruit through the machine insures a uniform treatment of all the fruit by the brush rollers 25 and renders unnecessary the cleaning out of the residual fruit from the machine by hand when completing the treatment of each lot.

It is also to be noted that whenever fruit is fed to the brusher 10 at a rate exceeding the average speed of the cleanout bars 56 in their movement through the machine, these bars present no substantial obstacle to the fruit passing over them sufficiently to compensate for the difference in the average rate of travel of the fruit and the bars.

What I claim is:

1. In combination with a fruit treating machine of the type employing a series of treating rolls rotatable about fixed axes and arranged transversely to the flow of fruit thereover and in adjacent parallel relation to form fruit supporting valleys therebetween whereby fruit resting in each valley is dislodged therefrom by incoming fruit and caused to pass into the next valley: a cleanout bar disposed parallel to said rolls; guide means disposed substantially at the plane of the crests of said rolls; endless chains guided by said guide means; arms extending angularly from opposite ends of said bar and pivotally connected to said chains, said pivot points being spaced a substantial distance longitudinally of said machine from said bar and permitting said bar to freely rest on the crests of said rolls when disposed opposite these; said arms being substantially shorter than the distance spacing the axes of adjacent rolls; and means for limiting the downward swing of said arms about said pivot points to prevent undue friction being set up between said bar and the surface of one of said rolls when the latter is engaged by said bar.

2. In combination with a fruit treating machine of the type employing a series of treating rolls rotatable about fixed axes and arranged transversely to the flow of fruit thereover and in adjacent parallel relation to form fruit supporting valleys therebetween whereby fruit resting in each valley is dislodged therefrom by incoming fruit and caused to pass into the next valley: a cleanout bar disposed parallel with said rolls; carrier means moving to propel said bar substantially along the path of travel of fruit over said rolls so that said bar engages fruit in advance thereof and propels it through said machine, said bar in said travel riding at successive intervals for substantial distances on upwardly disposed portions of said rolls; and means on said carrier means through which the latter is associated with said bar for transmitting horizontal movement of said carrier means substantially rigidly through said bar to said fruit yet permitting the limited degree of up and down motion of said bar relative to said carrier means requisite for the bar to readily follow the upper contour of each roll while resting thereon without substantial horizontal movement of said bar relative to said carrier means.

3. In combination with a fruit treating machine of the type employing a series of treating rolls rotatable about fixed axes and arranged transversely to the flow of fruit thereover and in adjacent parallel relation to form fruit supporting valleys therebetween whereby fruit resting in each valley is dislodged therefrom by incoming fruit and caused to pass into the next valley: a cleanout bar disposed parallel to said rolls; carrier means for substantially rigidly transmitting movement to said bar along the path of travel of fruit over said rolls so as to cause said bar to engage fruit in advance thereof and propel it through said machine, said means permitting said bar freedom during said travel to ride at successive intervals on substantial upwardly disposed portions of said rolls and preventing substantial horizontal movement of the bar relative to the carrier means; and means for supporting said bar during said movement when said bar is moving away from contact with one roll and towards contact with the next roll.

4. In combination with a fruit treating machine of the type employing a series of treating rolls rotatable about fixed axes and arranged transversely to the flow of fruit thereover and in adjacent parallel relation to form fruit supporting valleys therebetween whereby fruit resting in each valley is dislodged therefrom by incoming fruit and caused to pass into the next valley: a cleanout bar disposed parallel to said rolls; carrier means for substantially rigidly transmitting movement to said bar along the path of travel of fruit over said rolls so as to cause said bar to engage fruit in advance thereof and propel it through said machine, said means permitting said bar freedom during said travel to ride at successive intervals on substantial upwardly disposed portions of said rolls and preventing substantial horizontal movement of the bar relative to the carrier means, said aforesaid means having means acting on said bar while the latter is riding on each roll and cooperating with the forces set up by friction between said roll and said bar to produce a resultant force substantially free from the tendency to bind said bar against said roll, during a major portion of the distance through which said bar is in contact with said roll.

5. In combination with a fruit treating machine of the type employing a series of treating rolls rotatable about fixed axes and arranged transversely to the flow of fruit thereover and in adjacent parallel relation to form fruit supporting valleys therebetween whereby fruit resting in each valley is dislodged therefrom by incoming fruit and caused to pass into the next valley: a cleanout bar disposed parallel with said rolls; carrier means to carry said bar substantially along the path of travel of fruit over said rolls so as to engage fruit in advance thereof and propel it through said machine, said bar in said travel riding successively and relatively freely on upwardly disposed portions of said rolls; mounting means on said carrier means for mounting said bar thereon, said bar mounting means permitting a limited degree of vertical movement by said bar within said path and preventing substantial horizontal movement of the bar relative to the carrier means; and means supporting said bar at the lower limit of said movement when said bar is being carried by said carrier means from contact with one roll towards contact with the next adjacent roll.

6. In combination with a fruit treating machine of the type employing a series of treating rolls rotatable about fixed axes and arranged transversely to the flow of fruit thereover and in adjacent parallel relation to form fruit supporting valleys therebetween whereby fruit resting in each valley is dislodged therefrom by incoming fruit and caused to pass into the next valley: a cleanout bar disposed parallel with said rolls; carrier means to carry said bar substantially along the path of travel of fruit over said rolls so as to engage fruit in advance thereof and propel it through said machine, said bar in said travel riding successively and relatively freely on upwardly disposed portions of said rolls; and mounting means on said carrier means for mounting said bar thereon, said bar mounting means permitting a limited degree of vertical movement by said bar within said path and supporting said bar at the lower limit of said movement when said bar is being carried by said carrier means from contact with one roll towards contact with the next adjacent roll, said mounting means cooperating with each roll to confine the movement of said bar, while the latter is in contact with various portions of the up-turned surface of said roll, by the application of forces which combine with the force of frictional contact between said roll and said bar to substantially prevent the development of a binding resultant force at said point of contact which would substantially retard the rotation of said roll.

7. A combination as in claim 1, in which means is provided for limiting the upward swing of said arms to positions where said bar is disposed in the path of fruit passing through said machine and relatively close to the plane of the crests of said rolls.

8. In combination with a fruit treating machine of the type employing a series of treating rolls rotatable about fixed axes and arranged transversely to the flow of fruit thereover and in adjacent parallel relation to form fruit supporting valleys therebetween whereby fruit resting in each valley is dislodged therefrom by incoming fruit and caused to pass into the next valley: a cleanout bar disposed parallel with said rolls; carrier means moving to propel said bar substantially along the path of travel of fruit over said rolls so that said bar engages fruit in advance thereof and propels it through said machine, said bar in said travel riding at successive intervals for substantial distances on upwardly disposed portions of said rollers; and means on said carrier means for pivotally mounting the said bar on said carrier means, the axis of said pivots being eccentric to the axis of said bar and being so positioned that the axis of said bar is elevated at least as high as said pivotal axis as the bar rides across the crests of said rolls.

9. In combination with a fruit treating machine of the type employing a series of treating rolls rotatable about fixed axes and arranged transversely to the flow of fruit thereover and in adjacent parallel relation to form fruit supporting valleys therebetween whereby fruit resting in each valley is dislodged therefrom by incoming fruit and caused to pass into the next valley: a cleanout bar disposed parallel with said rolls; carrier means moving to propel said bar substantially along the path of travel of fruit over said rolls so that said bar engages fruit in advance thereof and propels it through said machine, said bar in said travel riding at successive intervals for substantial distances on upwardly disposed portions of said rollers; and means on said carrier means for pivotally mounting the said bar on said carrier means, the axis of said pivots being eccentric to the axis of said bar and being so positioned that the axis of said bar is elevated above said pivotal axis when said bar rides over the crests of said rolls.

10. In combination with a fruit treating machine of the type employing a series of treating rolls rotatable about fixed axes and arranged transversely to the flow of fruit thereover and in adjacent parallel relation to form fruit supporting valleys therebetween whereby fruit resting in each valley is dislodged therefrom by incoming fruit and caused to pass into the next valley: a cleanout bar disposed parallel with said rolls; carrier means moving to propel said bar substantially along the path of travel of fruit over said rolls so that said bar engages fruit in advance thereof and propels it through said machine, said bar in said travel riding at successive intervals for substantial distances on upwardly disposed portions of said rollers; means on said carrier means for pivotally mounting the said bar on said carrier means, the axis of said pivots being eccentric to the axis of said bar and being so positioned that the axis of said bar is elevated above said pivotal axis when said bar rides over the crests of said rolls, and means limiting the downward swing of said bar about said pivotal axis to prevent the axis of said bar descending a substantial distance below said pivotal axis as said bar traverses the valleys between the rolls.

11. The combination as in claim 2, which has a power means actuating said carrier means to automatically move said bar along said path by intermittent movements separated by pauses, said power means causing said bar to halt over a crest of one of said rolls at the end of each such movement.

12. The combination as in claim 3, which has a power means actuating said carrier means to automatically move said bar along said path by intermittent movements separated by pauses, said power means causing said bar to halt over a crest of one of said rolls at the end of each such movement.

13. The combination as in claim 4, which has a power means actuating said carrier means to automatically move said bar along said path by intermittent movements separated by pauses, said power means causing said bar to halt over a crest of one of said rolls at the end of each such movement.

14. The combination as in claim 8, which has a power means actuating said carrier means to automatically move said bar along said path by intermittent movements separated by pauses, said power means causing said bar to halt over a crest of one of said rolls at the end of each such movement.

GERALD C. PAXTON.